(12) United States Patent
Wieman (10) Patent No.: US 9,487,119 B1
(45) Date of Patent: Nov. 8, 2016

(54) EASY LOAD TRAILER

(71) Applicant: Richard L. Wieman, Columbia, MO (US)

(72) Inventor: Richard L. Wieman, Columbia, MO (US)

( * ) Notice: Subject to any disclaimer, the term of this patent is extended or adjusted under 35 U.S.C. 154(b) by 0 days.

(21) Appl. No.: 14/934,389

(22) Filed: Nov. 6, 2015

(51) Int. Cl.
| B60P 1/04 | (2006.01) |
| B60P 1/16 | (2006.01) |
| B60P 1/14 | (2006.01) |

(52) U.S. Cl.
CPC .. B60P 1/04 (2013.01); B60P 1/14 (2013.01); B60P 1/16 (2013.01)

(58) Field of Classification Search
CPC ................ B60P 1/04; B60P 1/14; B60P 1/16
See application file for complete search history.

(56) References Cited

U.S. PATENT DOCUMENTS

| 3,935,954 | A | * | 2/1976 | Woods | B60P 1/04 |
| | | | | | 414/24.5 |
| 3,985,250 | A | | 10/1976 | Mononen | |
| 4,023,690 | A | * | 5/1977 | Goode | B60P 1/32 |
| | | | | | 414/24.5 |
| 4,058,325 | A | * | 11/1977 | Schramm | B60G 5/04 |
| | | | | | 280/43.18 |
| 4,531,880 | A | | 7/1985 | Paques | |
| 4,573,845 | A | | 3/1986 | Carpenter | |
| 4,619,570 | A | | 10/1986 | Siebenga | |
| 4,666,359 | A | * | 5/1987 | Parr | B62D 63/061 |
| | | | | | 280/47.27 |
| 4,944,648 | A | * | 7/1990 | Parr | B62D 63/061 |
| | | | | | 280/405.1 |
| 4,968,096 | A | * | 11/1990 | Chattin | B62D 53/06 |
| | | | | | 298/20 R |
| 5,584,639 | A | * | 12/1996 | Walker, Jr. | B66F 9/065 |
| | | | | | 280/64 |
| 5,954,468 | A | * | 9/1999 | Marshall | A01D 87/122 |
| | | | | | 414/24.5 |
| 6,851,756 | B2 | * | 2/2005 | Pieschel | B60P 1/04 |
| | | | | | 298/17 R |
| 7,887,141 | B2 | * | 2/2011 | Pieschel | B60P 1/04 |
| | | | | | 298/17 R |
| 8,157,316 | B1 | | 4/2012 | Bartel | |
| 8,157,499 | B1 | | 4/2012 | Jones | |
| 8,496,298 | B2 | * | 7/2013 | Martini | B60P 1/04 |
| | | | | | 298/17 T |
| 2002/0081182 | A1 | | 6/2002 | Harris | |
| 2005/0220591 | A1 | | 10/2005 | Doskocil | |

FOREIGN PATENT DOCUMENTS

GB           111272 A * 11/1917 .............. B60P 1/04

OTHER PUBLICATIONS

Rock Line Products Inc.; Airtow Trailers, Ground-level Loading / Full Air Suspension, Flatbed Model Specs; http://www.airtow.com/flatbed-model-specs; Oct. 6, 2015.

* cited by examiner

*Primary Examiner* — Kaitlin Joerger
(74) *Attorney, Agent, or Firm* — Stinson Leonard Street LLP (57) ABSTRACT

A trailer for transporting relatively heavy and/or bulky items. Preferably, a single person is able to load and operate the trailer. The trailer has a frame, at least one wheel coupled to the frame, a platform pivotably coupled to the frame, and a link coupled to the frame and the platform. The platform moves between loading and transport positions. The platform has first and second sections that are generally perpendicular to each other. The first section is adjacent a ground surface when the platform is in the loading position. The platform pivots no more than approximately 60 degrees between the loading and transport positions. The link is operable to move the platform between the loading and transport positions. The link prevents the platform from rotating more than approximately 60 degrees between the loading and transport positions.

20 Claims, 10 Drawing Sheets

EASY LOAD TRAILER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention is directed to a trailer and, more particularly, to a trailer that preferably can be loaded and unloaded by a single person.

2. Description of Related Art

Conventional trailers for hauling heavy and/or bulky items have loading platforms that are at least one foot above the ground. Thus, with a conventional trailer, a heavy and/or bulky item must be lifted in order to load it on the trailer. Ramps may also be used to roll an item up to the trailer platform.

It is also known to provide a loading platform at the rear of the trailer that is raised and lowered vertically with a hydraulic system. When lowered, an item may be loaded on the platform at ground level, and when raised, the trailer may be towed. Such trailers are relatively complex and expensive due to the hydraulic system. Further, these trailers are not well suited to transporting a relatively heavy and tall item with a high center of gravity.

BRIEF SUMMARY OF THE INVENTION

A trailer having a frame, at least one wheel coupled to the frame, a platform pivotably coupled to the frame, and a link coupled to the frame and to the platform. The platform is pivotable between a loading position and a transport position. The platform has a first section and a second section that is generally perpendicular to the first section. The first section is generally horizontal when the platform is in the loading position, and the second section is generally vertical when the platform is in the loading position. The first section is configured to be adjacent a ground surface that supports the wheel when the platform is in the loading position. The platform pivots no more than approximately 60 degrees between the loading position and the transport position.

The link is coupled to the frame and to the second section of the platform. The link is operable to move the platform between the loading position and the transport position. The link prevents the platform from rotating more than approximately 60 degrees between the loading position and the transport position. The link may be a ratchet jack, a hydraulic cylinder, a winch and pulley system, or any other suitable mechanism. When in the loading position, a heavy item, such as a refrigerator, may preferably be rolled or slid on the first section of the trailer by a single person without lifting the item a significant distance. The link is preferably operable by a single person to move both the platform and a heavy item loaded on the platform from the loading position to the transport position and vice versa.

The trailer is preferably suitable for moving heavy and/or bulky items such as a refrigerator, a washer and dryer together, a gun safe, other types of appliances, lumber, and/or plywood.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
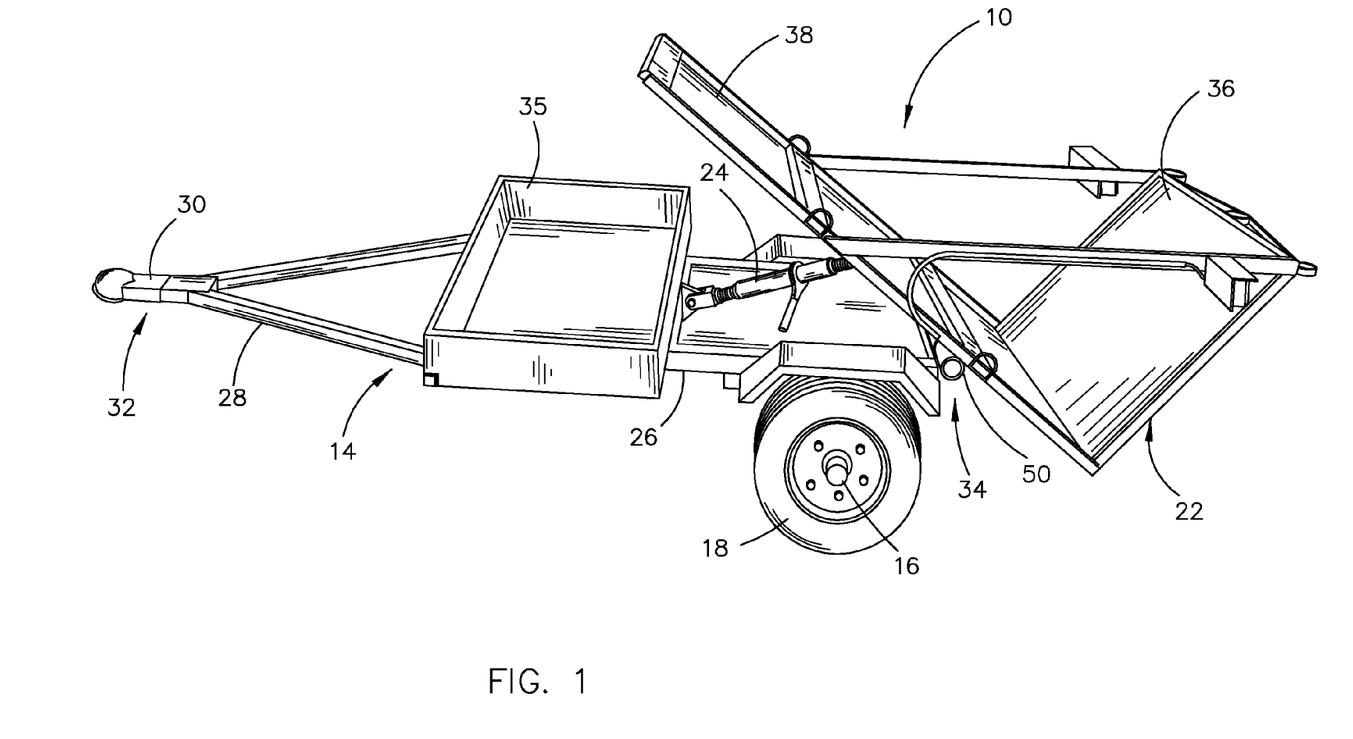
FIG. 1 is a perspective view of a trailer in accordance with an embodiment of the invention described herein.

A trailer in accordance with an embodiment of the invention described herein is identified generally as 10 in FIG. 1. Trailer 10 may be coupled to a vehicle (not shown) in any manner as is generally known in the art. Trailer 10 includes a frame 14, an axle 16 coupled to frame 14, wheels 18 and 20 (FIG. 8) coupled to ends of axle 16, a platform 22 pivotably coupled to frame 14, and a link 24 extending between frame 14 and platform 22.

Frame 14 includes a generally rectangular base 26 and a triangular forward section 28 coupled to and extending forward of base 26. Forward section 28 includes a receiver 30 that is operable to receive a ball (not shown) for coupling trailer 10 to a vehicle. Frame 14 extends from a front 32 to a rear 34. The front 32 of frame 14 is coupled to a vehicle, while axle 16 is rotatably coupled to the rear 34 of frame 14. A box 35 is mounted to a midsection of frame 14 for receiving items such as a dolly or straps that may assist in loading items on platform 22. Box 35, and any items positioned within box 35, also serve as a counterweight to balance trailer 10 and counteract the weight of platform 22 and any items strapped to platform 22 so that trailer is able to be towed smoothly by a vehicle.

Figure 2:
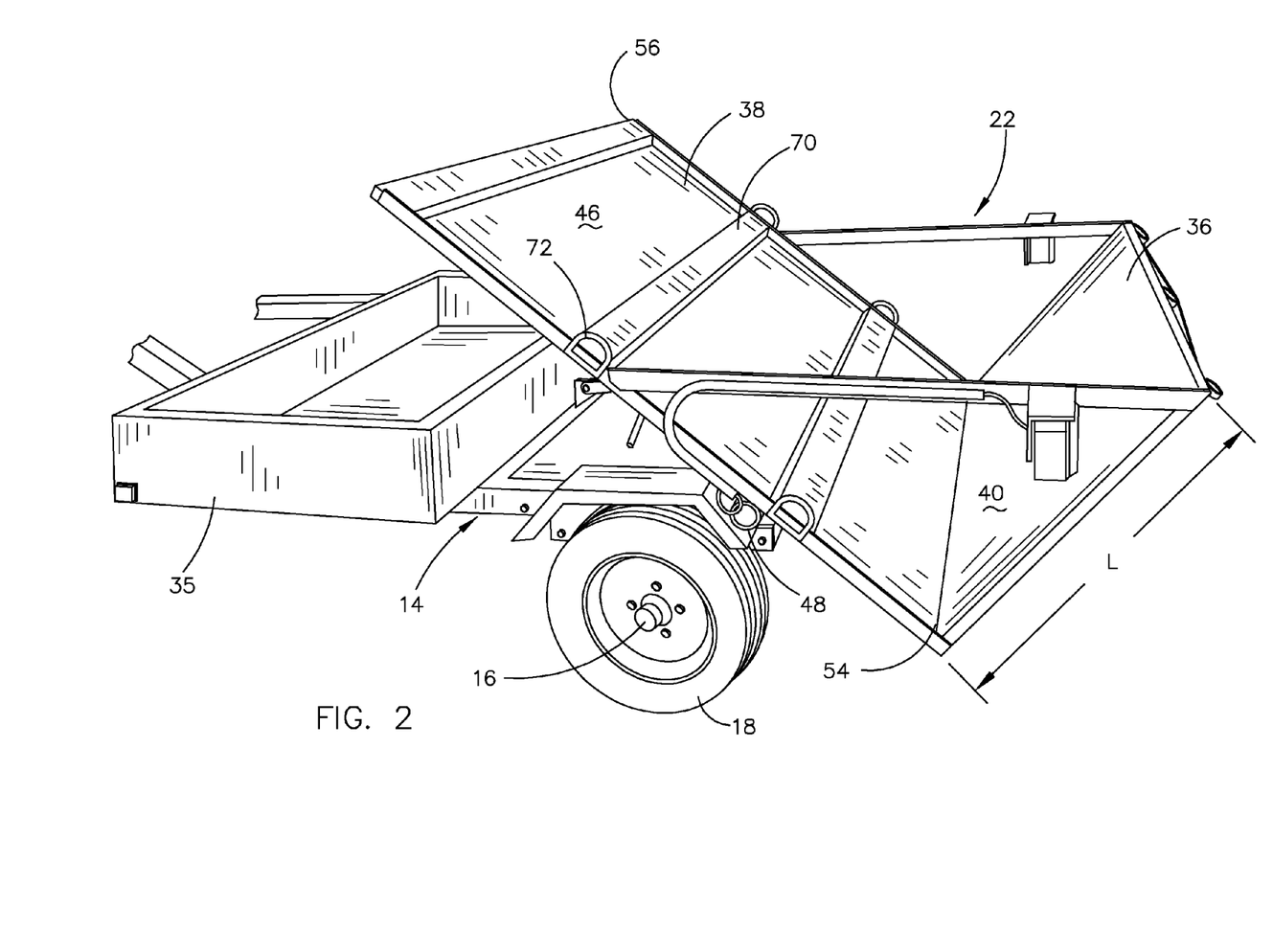
FIG. 2 is a close-up perspective view of the trailer of FIG. 1.

Referring to FIG. 2, platform 22 includes a lower section 36 and an upper section 38 that is joined to and extends generally upward from lower section 36. Lower section 36 extends rearward from upper section 38, and lower section 36 is generally perpendicular to upper section 38. Lower section 36 has an upper surface 40 and a lower surface 42

Figure 7:
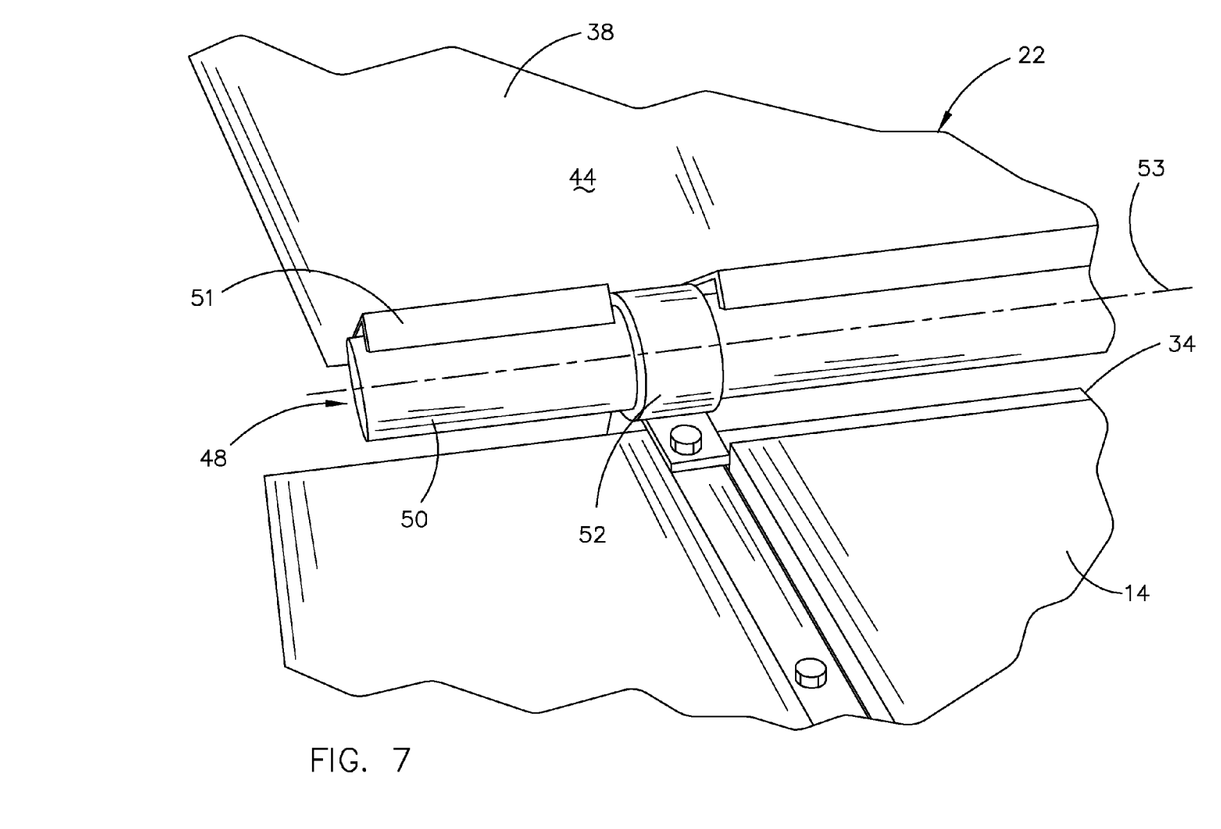
FIG. 7 is a close-up view of a hinge of the trailer of FIG. 1.
Figure 8:
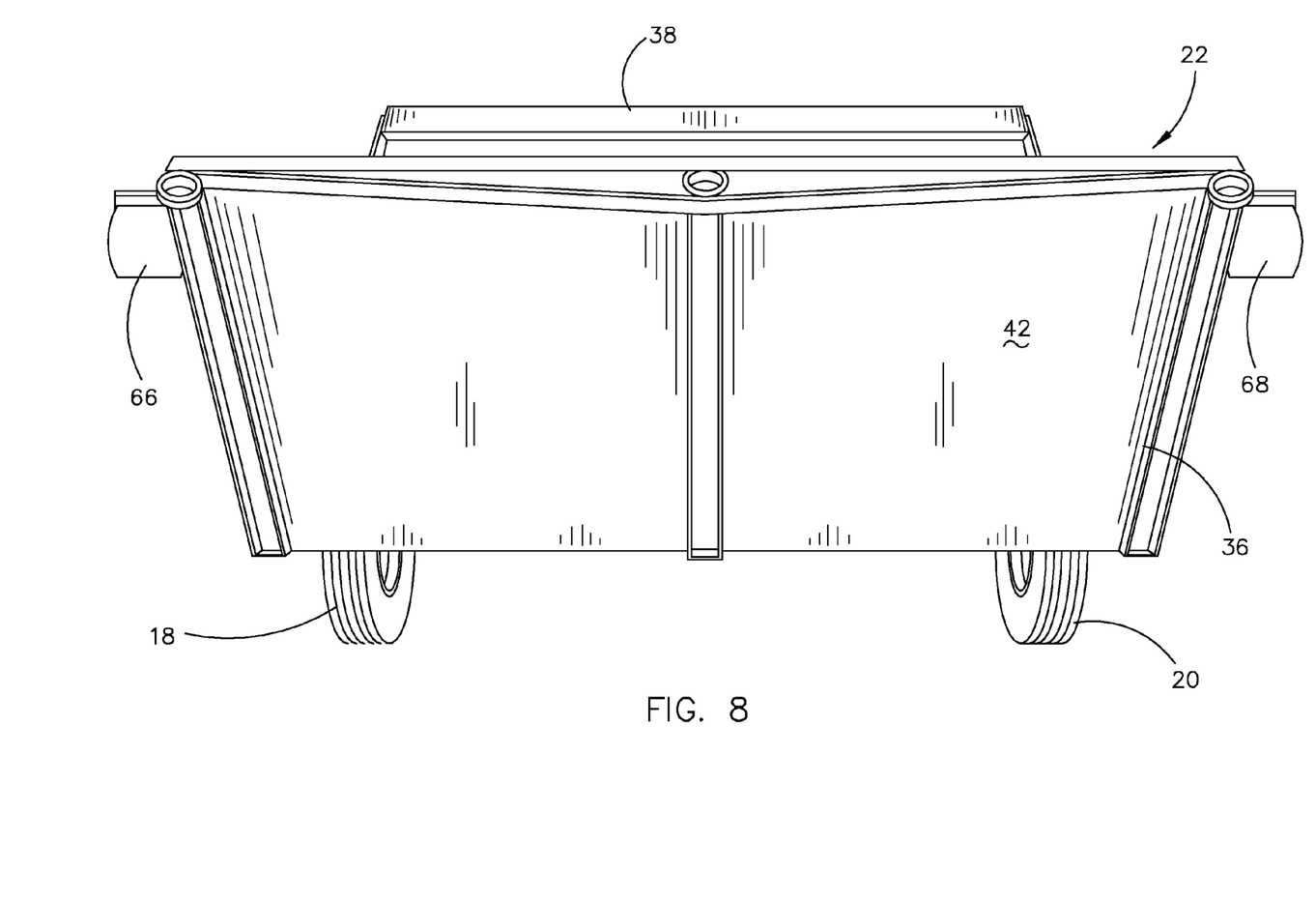
FIG. 8 is a rear elevational view of the trailer of FIG. 1 in the transport position.

(FIG. 8). Upper section 38 has a front surface 44 (FIGS. 6 and 7) and a rear surface 46. As shown in FIG. 7, a hinge assembly 48 pivotably joins platform 22 to frame 14. Hinge assembly 48 includes a tube 50 joined to the front surface 44 of platform 22 with brackets 51 that are preferably welded to tube 50 and platform 22. Tube 50 is received by mounts, one of which is shown as 52 in FIG. 7, joined to the rear 34 of frame 14. Tube 50 is rotatable within mount 52 to allow platform 22 to rotate with respect to frame 14. Hinge assembly 48 has a central axis 53 that is generally parallel with axle 16 (FIG. 1). Mount 52 preferably includes grease zerks (not shown) that allow mount 52 to be greased to reduce friction between mount 52 and tube 50.

Figure 9:
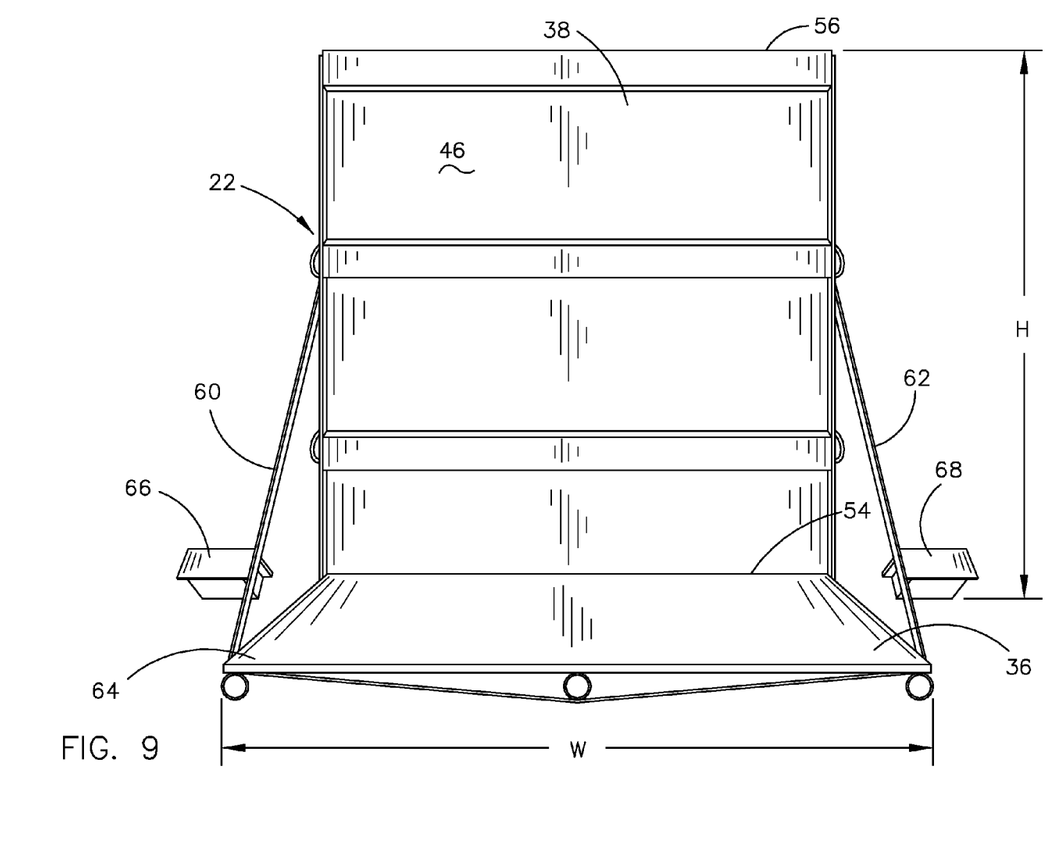
FIG. 9 is a rear elevational view of the trailer of FIG. 1 in the loading position.

Upper section 38 of platform 22 has a height H shown in FIG. 9 extending from a lower end 54 that is mounted to lower section 36 to an upper end 56. Tube 50 is mounted to upper section 38 a distance of approximately H/3 from lower section 36, as best shown in FIG. 1, and most preferably a distance of approximately 19.5 inches is between tube 50 and lower section 36. The height H is preferably between approximately 3 to 7 feet and is most preferably approximately 64 inches. As shown in FIG. 2, lower section 36 has a length L extending away from upper section 38. The length L is preferably between approximately 1.5 to 3.5 feet and is most preferably approximately 2.5 feet. Platform 22 has a width W shown in FIG. 9 that is preferably between approximately 5 to 6 feet and is most preferably approximately 5 feet. The dimensions above are preferable only and may be modified to configure platform 22 for hauling any type of item.

Figure 3:
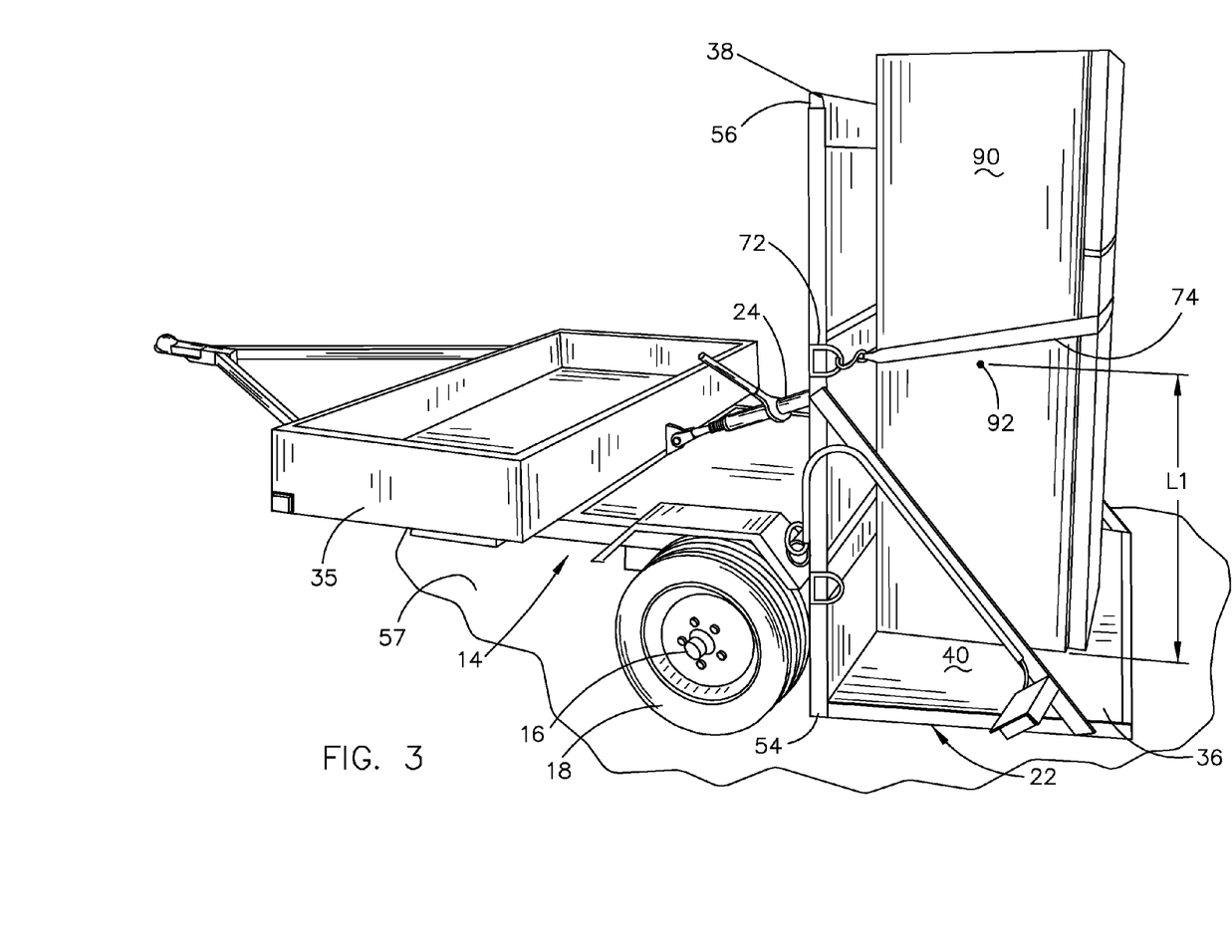
FIG. 3 is a perspective view of the trailer of FIG. 1 in a loading position.
Figure 4:
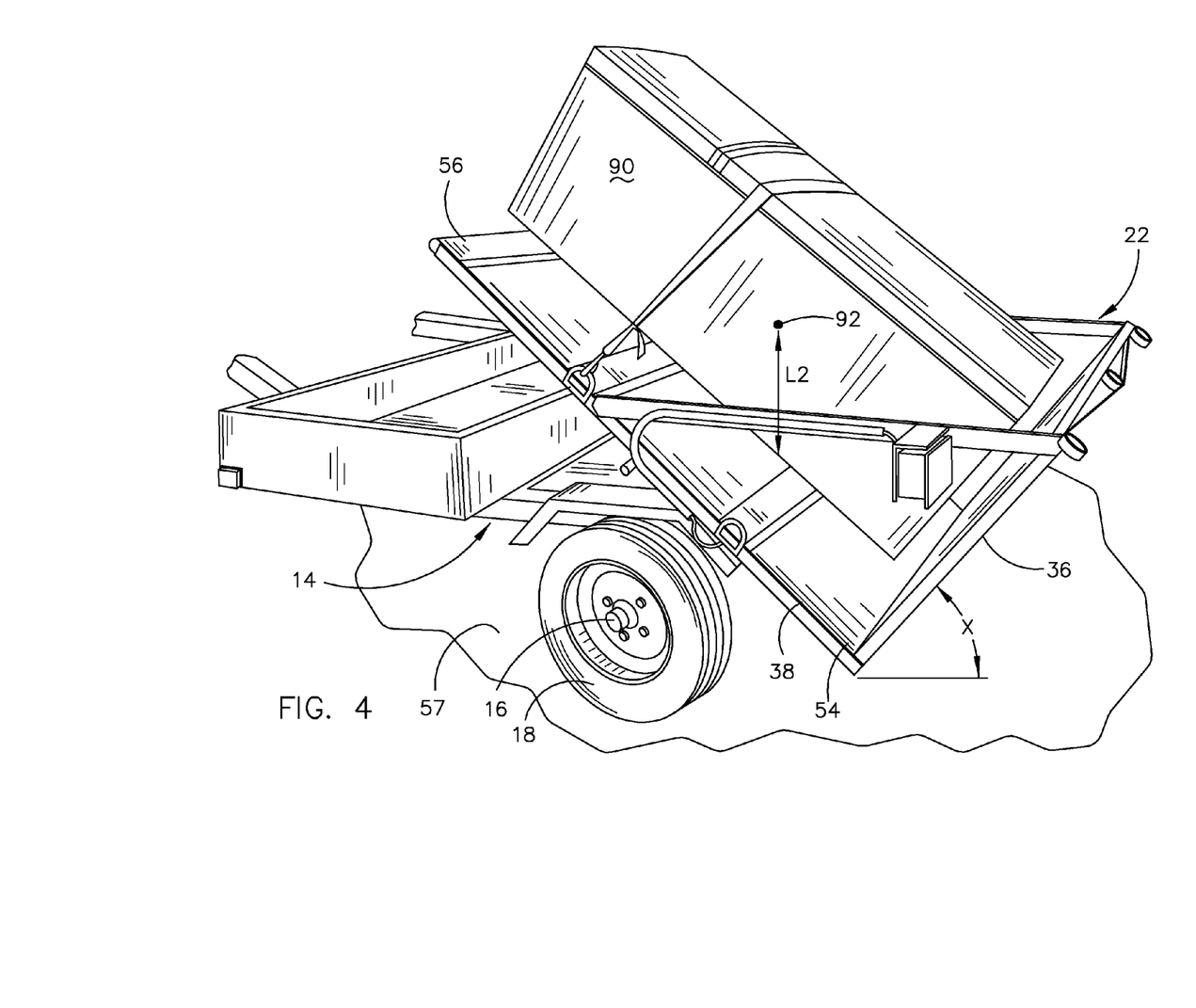
FIG. 4 is a perspective view of the trailer of FIG. 1 in a transport position.

Platform 22 pivots between the loading position shown in FIGS. 3 and 9 and the transport position shown in FIGS. 4 and 8. Lower section 36 of platform 22 is generally horizontal when platform 22 is in the loading position (FIG. 3), and upper section 38 is generally vertical when platform 22 is in the loading position. Lower section 36 is configured to be adjacent a ground surface 57 that supports wheels 18 and 20 when platform 22 is in the loading position so that a bulky and/or heavy item may easily be loaded on lower section 36. Preferably, upper surface 40 of lower section 36 is no more than approximately 2.5 to 3.5 inches above ground surface 57 when platform 22 is in the loading position. Lower section 36 and upper section 38 of platform 22 are positioned rearward of axle 16 and wheels 18 and 20 when platform 22 is in the loading position.

Platform 22 pivots an angle X, shown in FIG. 4, between the loading position and the transport position. The angle X is preferably no greater than approximately 60 degrees, is more preferably between approximately 35 to 55 degrees, and is most preferably approximately 45 degrees. The angle X is the angle formed between ground surface 57 and lower section 36 of platform 22 when ground surface 57 is horizontal and generally flat. When platform 22 pivots the angle X from the loading position to the transport position, lower section 36 is raised above ground surface 57, as shown in FIG. 4, so that trailer 10 may be pulled by a vehicle without interfering with ground surface 57. Rotating platform 22 the angle X to the transport position also lowers the upper end 56 of platform 22, and of an item strapped to platform 22, to reduce wind resistance and make the trailer 10 more aerodynamic as it is pulled by a vehicle. Further, rotation of platform 22 the angle X, lowers the center of gravity of platform 22 and of an item strapped to platform 22. This makes the platform 22 more stable and reduces the tendency of an item strapped to platform 22 to rotate about an axis that is aligned between the front 32 (FIG. 1) and rear 34 of frame 14 or about an axis that is aligned with axle 16.

Rotation of platform 22 the angle X is particularly advantageous when a large, bulky item, such as the refrigerator 90 shown in FIG. 4, is strapped to platform 22. By rotating the platform 22, the top of the refrigerator 90 is lowered making it more aerodynamic. Further, the center of gravity 92 of the refrigerator 90 is lowered making it less susceptible to tipping over.

The platform 22 rotates the angle X and no more than the angle X between the loading position and the transport position so that when an item is strapped to platform 22 and platform is rotated to the transport position, the item is still in a generally upright position as shown in FIG. 4. For example, referring to the refrigerator 90 shown in FIG. 4, if platform 22 was able to rotate past the angle X a full 90 degrees from the loading position, the refrigerator 90 would be horizontal and not generally upright. Further, by limiting rotation of the platform 22 to only the angle X when the platform 22 is rotated to the transport position, the weight of an item strapped to platform 22 is supported by both the lower section 36 and the upper section 38 of platform 22. For example, when platform 22 is in the loading position shown in FIG. 3, and refrigerator 90 is strapped to platform 22, all of the weight of refrigerator 90 is supported solely by lower section 36 of platform 22. If the trailer 10 was towed with the platform 22 in this position, the upper end of the refrigerator 90 would have a tendency to rotate rearward about an axis parallel to axle 16 away from upper section 38 due to the relatively high center of gravity 92 of refrigerator 90 and the fact that the weight of the refrigerator 90 is supported a relatively long distance L1 away from that center of gravity. In contrast, when platform 22 is in the transport position shown in FIG. 4, the weight of refrigerator 90 is supported by both the lower section 36 and the upper section 38 so that there is a shorter vertical distance L2 between the center of gravity 92 of refrigerator 90 and platform 22. If platform 22 was allowed to rotate a full 90 degrees from the loading position beyond the angle X, then the lower section 36 would no longer support a portion of the weight of refrigerator 90, and the refrigerator 90 would be susceptible to sliding forward off of platform 22 toward the front 32 (FIG. 1) of frame 14. Further, it is generally not desirable to transport refrigerator 90, and many other appliances and bulky items, in a horizontal position. Thus, it is advantageous to limit rotation of platform 22 to no more than the angle X described above.

When platform 22 is in the transport position shown in FIG. 4, at least a portion of upper section 38 extends forward of axle 16 to more evenly distribute the weight of platform 22 and an item strapped to platform 22 in front of and behind axle 16. Positioning at least a portion of the weight of platform 22 and of an item strapped to platform 22 in front of axle 16 toward the front 32 of frame 14 stabilizes the trailer 10 as it is pulled by a vehicle because it makes it less likely that the front 32 of frame 14 will rotate upward away from the vehicle towing trailer 10.

Figure 5:
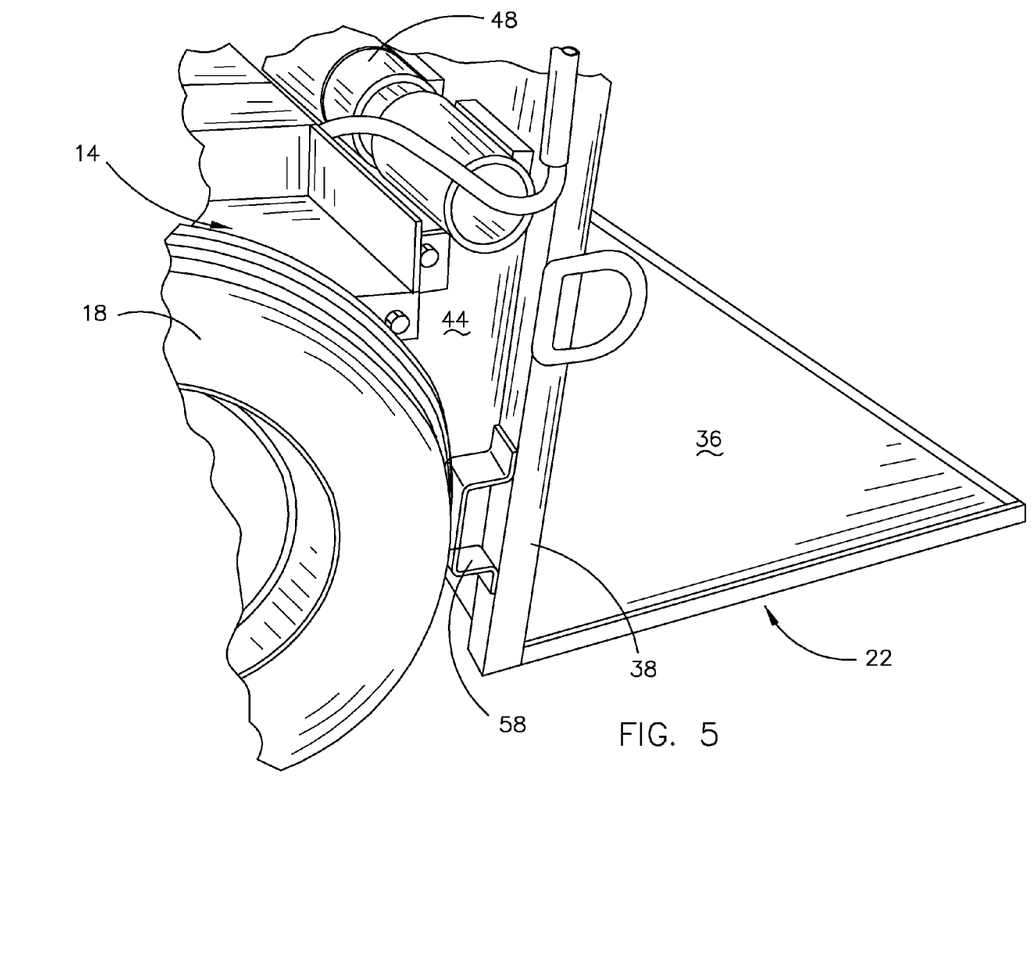
FIG. 5 is a close-up view of a wheel brake of the trailer of FIG. 1.

As shown in FIG. 5, platform 22 includes a wheel brake 58 that is mounted to the front surface 44 of upper section 38 rearward of wheel 18. Wheel brake 58 preferably abuts wheel 18 to prevent rearward rotation of wheel 18 when platform 22 is in the loading position shown in FIGS. 3 and 5. Another wheel brake (not shown) is preferably mounted to upper section 38 rearward of wheel 20 (FIG. 8). As shown in FIG. 9, platform 22 includes cross braces 60 and 62 that extend from approximately a midpoint of upper section 38 to a rear end 64 of lower section 36. Cross braces 60 and 62 prevent an item strapped to platform 22 from sliding off the side of platform 22. Lights 66 and 68 are mounted to cross braces 60 and 62, respectively. As shown in FIG. 8, lights 66 and 68 face rearward when platform 22 is in the transport position. Referring to FIG. 2, pads, one of which is identified as 70, are mounted to rear surface 46 of upper section 38 for protecting an item strapped to platform 22. Loops, one of which is identified as 72 in FIG. 3, are mounted to sides of upper section 38 for receiving straps, one of which is identified as 74, to secure an item, such as refrigerator 90, to platform 22 for transport. It is within the scope of the invention for loops 72 to be omitted and for straps 74 to be permanently joined to upper section 38. The trailer 10 may also include a tarp (not shown) that is mounted to frame 14 or platform 22 for covering a load and that rolls up for storage.

Figure 6:
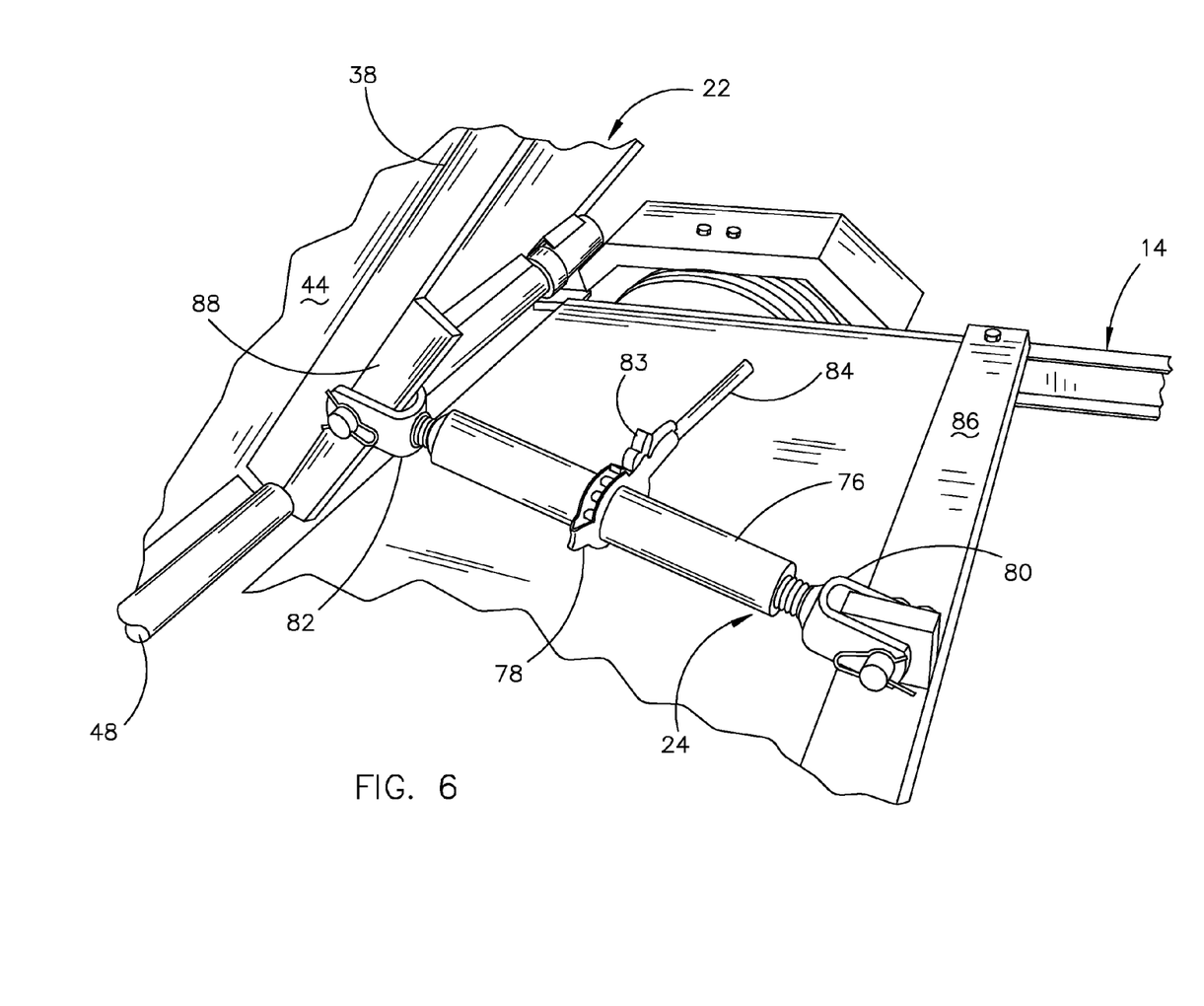
FIG. 6 is a close-up view of a link of the trailer of FIG. 1.

Referring to FIG. 6, link 24 is preferably a ratchet jack that includes a housing 76, a ratchet 78 at a midpoint of housing 76, a first extender 80 coupled to ratchet 78 and partially received by housing 76, a second extender 82 coupled to ratchet 78 and partially received by housing 76, a switch 83 coupled to ratchet 78, and a lever 84 coupled to ratchet 78. As is generally known in the art, when switch 83 is in a first position, rotation of lever 84 causes extension of first and second extenders 80 and 82 outward away from housing 76. When switch 83 is in a second position, rotation of lever 84 causes retraction of first and second extenders 80 and 82 inward toward housing 76. Further, ratchet 78 locks first and second extenders 80 and 82 in place such that the first and second extenders 80 and 82 will not move unless force is applied to lever 84. Link 24 may be a ratchet jack made by Koch Industries, Inc. of Golden Valley, Minn.

First extender 80 of link 24 includes a clevis that is coupled to a crossbar 86 of frame 14 with a clevis pin. Crossbar 86 is positioned forward of platform 22 and is generally parallel to hinge assembly 48. Second extender 82 of link 24 includes a clevis that is coupled to a support 88 of platform 22 with a clevis pin. Support 88 is joined to the front surface 44 of upper section 38 of platform 22. Second extender 82 is coupled to upper section 38 of platform 22 approximately midway between the lower end 54 and the upper end 56 of upper section 38, as best shown in FIG. 3. Second extender 82 is coupled to upper section 38 a distance above hinge assembly 48 so that extension of first and second extenders 80 and 82 causes platform 22 to rotate toward its loading position and retraction of first and second extenders 80 and 82 causes platform 22 to rotate toward its transport position. The positioning of link 24 between the upper section 38 of platform 22 and frame 14 also prevents platform 22 from rotating more than the angle X shown in FIG. 4 to limit rotation of platform 22 so that it cannot rotate beyond the angle X. Preferably, the first and second extenders 80 and 82 are fully retracted when the platform 22 is in the transport position. When platform 22 is in the loading position, first and second extenders 80 and 82 of link 24 are in an extended position, and when platform 22 is in the transport position, first and second extenders 80 and 82 of link 24 are in a retracted position. Link 24 is preferably capable of pivoting platform 22 and refrigerator 90, or another relatively heavy item, when only a single person applies force to lever 84.

Figure 10:
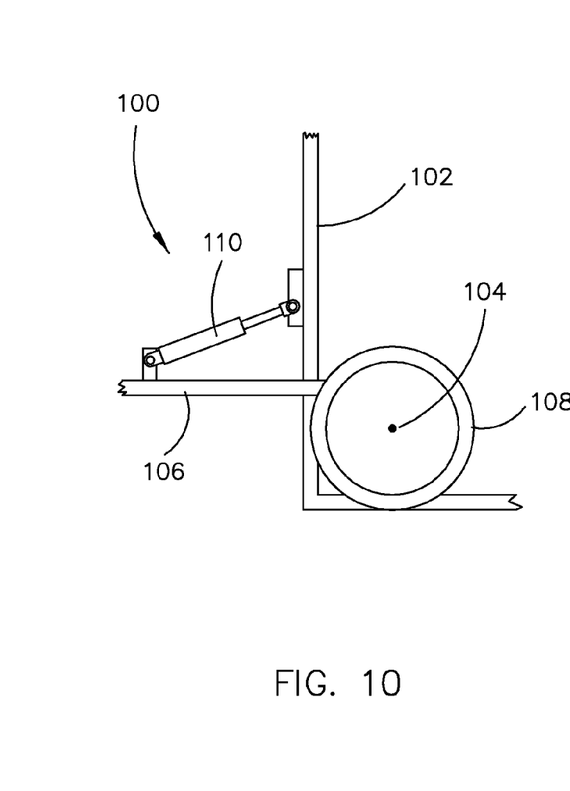
FIG. 10 is a side elevational view of an alternative embodiment of trailer with a platform positioned forward of an axle when the platform is in a loading position.

In an alternative embodiment of trailer 100 shown in FIG. 10, a platform 102 is positioned forward of an axle 104 when the platform 102 is in a loading position. Positioning platform 102 further forward relative to the platform 22 described above has the advantage of potentially increasing the stability of trailer 100 by placing more of the weight of platform 102 and of an item strapped to platform 102 further forward of axle 104 where it may be supported by a vehicle towing trailer 100. Trailer 100 has a frame 106 that is configured to accommodate platform 102 between a pair of wheels, one of which is identified as 108, coupled to axle 104. A link 110 couples platform 102 to frame 106 in a similar manner as described above except that link 110 is a hydraulic cylinder. Link 110 is extendable to move platform 102 to the loading position shown in FIG. 10 and is retractable to pivot platform 102 to a transport position, in which platform 102 is preferably in substantially the same position as the platform 22 shown in FIG. 4. A hydraulic system (not shown) is preferably connected to link 110 for extending and retracting the hydraulic cylinder. It is within the scope of the invention for the link 110 to be substituted for the link 24 described above and for the link 24 to be substituted for the link 110 shown in FIG. 10. Besides the differences noted above, trailer 100 is substantially similar to trailer 10 shown in FIGS. 1-9 and described above.

Figure 11:
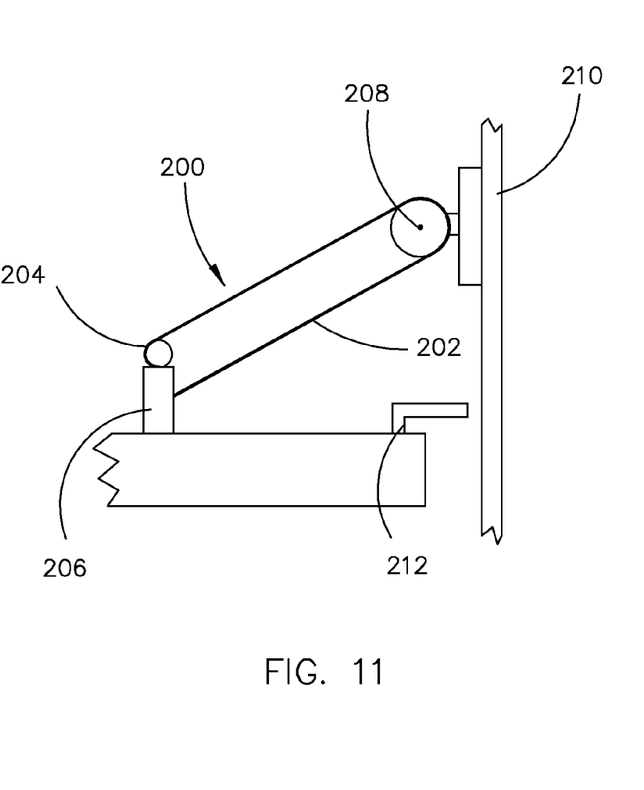
FIG. 11 is a side elevational view of an alternative embodiment of trailer with a winch and pulley system.

An alternative embodiment of link 200 is shown in FIG. 11. Link 200 may be substituted for link 24 or link 110 described above. Link 200 includes a cable 202 with one end coupled to a winch 204 and another end coupled to a frame 206. The cable 202 is routed around a pulley 208 that is mounted to a platform 210. Frame 206 and platform 210 are preferably substantially similar to the frame 14 and platform 22 described above. Rotation of winch 204 in one direction winds cable 202 around winch 204 and moves platform 210 from the loading position shown in FIG. 11 to a transport position, in which platform 210 is preferably in substantially the same position as the platform 22 shown in FIG. 4. Rotation of winch 204 in the opposite direction unwinds cable 202 from winch 204 causing platform 210 to rotate to the loading position via gravity. Preferably, there is a stop 212 mounted to frame 206 to prevent platform 210 from rotating more than the angle X shown in FIG. 4 to the transport position. There is also preferably a lock (not shown) that is operable to prevent movement of platform 210 when in the transport position. The lock may be, for example, a pin that engages a portion of the platform 210 and frame 206 when platform 210 is in the transport position. The lock may also operate to lock cable 202 to winch 204 to prevent movement of platform 210.

In operation, trailer 10 is coupled to a vehicle. Switch 83 (FIG. 6) of link 24 is moved to its first position, and lever 84 is rotated to move platform 22 into its loading position shown in FIG. 3. An item, such as the refrigerator 90, is loaded on platform 22 and securely strapped to platform 22 with strap 74. Switch 83 (FIG. 6) is then moved to its second position, and lever 84 is rotated to move platform 22 to its transport position shown in FIG. 4. When platform 22 is moved to its transport position, the vehicle may tow trailer 10 to a destination. To unload the trailer 10, switch 83 is moved to its first position, and lever 84 is rotated to move platform 22 to its loading position.

Trailer 10 is configured so that a single person may load a relatively heavy item or items on platform 22 by rolling or sliding the item(s) on platform 22 without lifting them a significant distance. Lower section 36 of platform 22 is close to the ground surface 57 when platform 22 is in the loading position, as shown in FIG. 3, so that a single person may load a heavy item on platform 22 with a dolly. Further, link 24 is configured to pivot platform 22 and a heavy item, such as refrigerator 90, when a single person applies force to the lever 84 (FIG. 6) of link 24.

Trailer 100 (FIG. 10) operates in a similar manner as trailer 10 described above except that for trailer 100, a hydraulic system (not shown) is used to move the hydraulic cylinder link 110 and pivot the platform 102 between a loading position and a transport position. Link 200 (FIG. 11) may be substituted for the links 24 and 110. For link 200, winch 204 is operated to pull or extend cable 202 and move platform 210 to the transport or loading position.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A trailer comprising:
    a frame;
    at least one wheel coupled to the frame;
    a platform pivotably coupled to the frame and moveable between a loading position and a transport position, wherein the platform comprises a first section and a second section that is generally perpendicular to the first section, wherein the first section is generally horizontal when the platform is in the loading position, wherein the second section is generally vertical when the platform is in the loading position, wherein the first section is configured to be adjacent a ground surface that supports the wheel when the platform is in the loading position, and wherein the platform pivots no more than approximately 60 degrees between the loading position and the transport position; and
    a link coupled to the frame and to the second section of the platform, wherein the link is operable to move the platform between the loading position and the transport position, wherein the link prevents the platform from rotating more than approximately 60 degrees between the loading position and the transport position, wherein the link is moveable between an extended position and a retracted position, wherein the platform is in the loading position when the link is in the extended position, and wherein the platform is in the transport position when the link is in the retracted position, wherein the link comprises a ratchet, a lever coupled to the ratchet, a switch coupled to the ratchet and moveable between first and second positions, a first extender coupled to the ratchet, and a second extender coupled to the ratchet, wherein rotation of the lever when the switch is in the first position extends the first and second extenders away from the ratchet, and wherein rotation of the lever when the switch is in the second position retracts the first and second extenders toward the ratchet.

2. The trailer of claim 1, wherein the platform pivots between approximately 35 to 55 degrees between the loading position and the transport position.

3. The trailer of claim 2, wherein the platform pivots approximately 45 degrees between the loading position and the transport position.

4. The trailer of claim 1, further comprising an axle coupled to the frame, wherein the wheel is coupled to the axle.

5. The trailer of claim 4, wherein the second section is positioned rearward of the axle when the platform is in the loading position, and wherein at least a portion of the second section extends forward of the axle when the platform is in the transport position.

6. The trailer of claim 4, wherein the second section is positioned forward of the axle when the platform is in the loading position.

7. The trailer of claim 1, wherein the second section comprises a first end that is coupled to the first section and a second end, and wherein the link is coupled to the second section approximately midway between the first end and the second end.

8. The trailer of claim 1, wherein the frame comprises a front and a rear, wherein the platform is coupled to the rear of the frame, and wherein the first section of the platform extends rearward from the second section of the platform.

9. The trailer of claim 1, wherein the platform comprises a wheel brake that abuts the wheel when the platform is in the loading position.

10. A trailer comprising:
    a frame;
    at least one wheel coupled to the frame;
    a platform pivotably coupled to the frame and moveable between a loading position and a transport position, wherein at least a portion of the platform is configured to be adjacent a ground surface that supports the wheel when the platform is in the loading position, and wherein the portion of the platform raises as the platform moves from the loading position to the transport position; and
    a link coupled to the frame and to the platform, wherein the link is operable to move the platform between the loading position and the transport position, wherein the link comprises a ratchet and at least one extender, wherein rotation of a portion of the link when the link is in a first position extends the extender away from the ratchet, and wherein rotation of the portion of the link when the link is in a second position retracts the extender toward the ratchet.

11. The trailer of claim 10, wherein the platform is in the loading position when the extender is extended away from the ratchet, and wherein the platform is in the transport position when the extender is retracted toward the ratchet.

12. The trailer of claim 11, wherein the link further comprises a lever coupled to the ratchet, a switch coupled to the ratchet and moveable between the first position and the second position, and a second extender coupled to the ratchet, wherein rotation of the lever when the switch is in the first position extends the first and second extenders away from the ratchet, and wherein rotation of the lever when the switch is in the second position retracts the first and second extenders toward the ratchet.

13. The trailer of claim 10, wherein the platform comprises a first section and a second section that is generally perpendicular to the first section, wherein the first section is generally horizontal when the platform is in the loading position, wherein the second section is generally vertical when the platform is in the loading position, wherein the first section is configured to be adjacent a ground surface that supports the wheel when the platform is in the loading position.

14. The trailer of claim 13, wherein the link is coupled to the second section of the platform.

15. The trailer of claim 13, further comprising an axle coupled to the frame, wherein the wheel is coupled to the axle, wherein the second section is positioned rearward of the axle when the platform is in the loading position, and wherein at least a portion of the second section extends forward of the axle when the platform is in the transport position.

16. The trailer of claim 13, further comprising an axle coupled to the frame, wherein the wheel is coupled to the axle, wherein the second section is positioned forward of the axle when the platform is in the loading position.

17. The trailer of claim 13, wherein the second section comprises a first end that is coupled to the first section and a second end, and wherein the link is coupled to the second section approximately midway between the first end and the second end.

18. The trailer of claim 13, wherein the frame comprises a front and a rear, wherein the platform is coupled to the rear of the frame, and wherein the first section of the platform extends rearward from the second section of the platform.

19. The trailer of claim 10, wherein the platform pivots no more than approximately 60 degrees between the loading position and the transport position.

20. The trailer of claim 19, wherein the link prevents the platform from rotating more than approximately 60 degrees between the loading position and the transport position.

\* \* \* \* \*